Jan. 12, 1960 A. ABBENANTE 2,920,521
VARIABLE ANGLE STRIP CUTTING MACHINE
Filed April 1, 1957 2 Sheets-Sheet 1
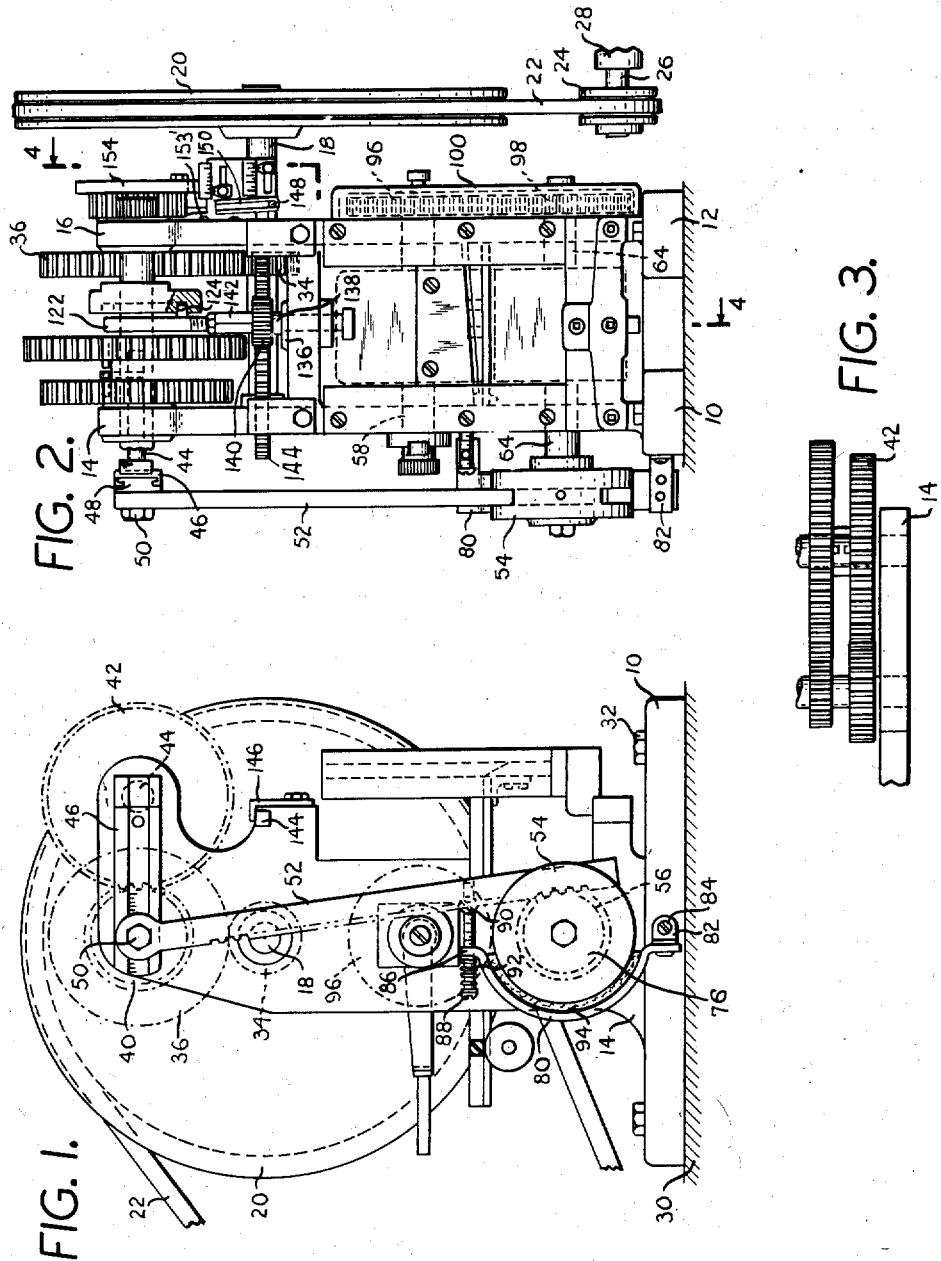
INVENTOR
ANTHONY ABBENANTE
BY
ATTORNEY.

Jan. 12, 1960  A. ABBENANTE  2,920,521
VARIABLE ANGLE STRIP CUTTING MACHINE
Filed April 1, 1957  2 Sheets-Sheet 2
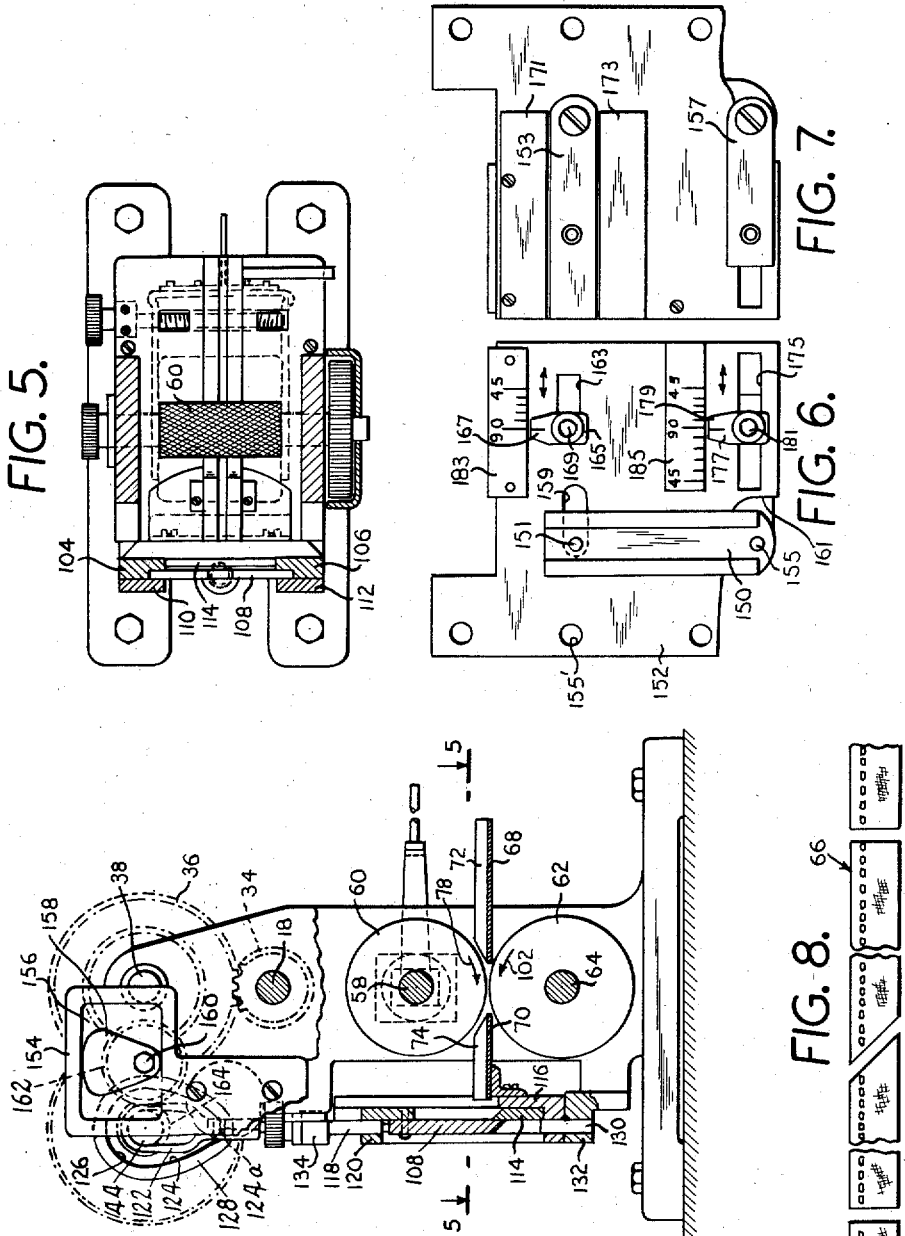
INVENTOR
ANTHONY ABBENANTE
BY
ATTORNEY.

United States Patent Office 2,920,521
Patented Jan. 12, 1960

2,920,521

VARIABLE ANGLE STRIP CUTTING MACHINE

Anthony Abbenante, Ozone Park, N.Y.

Application April 1, 1957, Serial No. 649,832

6 Claims. (Cl. 83—215)

This invention relates to a variable angle strip cutting machine.

In many industries, the corset, girdle and brassiere making industry being one, it is necessary to cut large numbers of strips of various kinds of material to predetermined lengths. These strips may be cut square at both ends or they may be cut square at one end and cut at an angle at the opposite end. Sometimes the strips are cut at an angle at both ends. Sometimes the angles are the same at both ends and at other times they are different. A definite need has accordingly arisen for a machine which would be capable of cutting strips to predetermined lengths with their ends cut square or at any angle or both square and at any angle.

It is accordingly the principal object of this invention to provide a variable angle strip cutting machine which is capable of cutting strips to any preselected and predetermined lengths and which is also capable of cutting the ends of these strips either square or at any angle or both square and at any angle. This machine is automatic in its operation and it automatically cuts a continuous strip of material to predetermined lengths with its ends cut either square or at an angle or square at one end and at an angle at the opposite end. The present machine has been designed primarily in relation to the strips or tapes which are used in the manufacture of corsets, girdles and brassieres but it will be understood that this is purely illustrative and that the machine herein claimed is equally suitable for cutting strip material in other industries. Similarly, although the present machine has been designed particularly in connection with narrow strips made of textile fabric, with and without padding, the principles of the machine are equally applicable to strips made of other material, such as plastics and leather. Nor is it essential that the strips be narrow, as is the case with the strips and tapes used in making corsets, girdles and brassieres. The machine which is herein claimed is equally capable of cutting relatively wide material, depending upon the width of the machine and its cutting blade.

An important feature of this invention is the adjustment means whereby the machine may be adjusted to change the angle of its cutting blade or knife. The adjustment is positive and it involves the use of an adjustable guide or template which guides the machine in respect to the cutting angle at the two ends of each strip. Thus the single adjustable template herein described will determine the cutting angle at the front end of each strip as well as the cutting angle at the back end thereof, and said angles may individually be changed at will by simply adjusting the template. Said template is calibrated to facilitate adjusting and setting it to any desired angle relative to either end of the strip.

The invention is illustrated in the accompanying drawing in which:

Fig. 1 is a side view of a variable angle strip cutting machine made in accordance with this invention.

Fig. 2 is a front view thereof.

Fig. 3 is a fragmentary view of a gear drive utilized in said machine.

Fig. 4 is a vertical section on the line 4—4 of Fig. 2.

Fig. 5 is a horizontal section on the line 5—5 of Fig. 4.

Fig. 6 is a front view of the adjustable guide plate by which the cutting angles of the machine may be varied at will.

Fig. 7 is a back view thereof.

Fig. 8 is a fragmentary view of a series of strips cut on said machine showing them terminating at different angles.

Referring now to the drawing it will be seen that the cutting machine herein claimed includes a base 10, a second base 12, a side frame 14 mounted on base 10, a side frame 16 mounted on base 12 and cross members which are rigidly secured to the two side frames in order to support them in spaced parallel relation to each other to form the framework of the machine. There is a main drive shaft 18 which is journaled into the two side frame members and a pulley 20 is secured to said shaft 18. A drive belt 22 connects pulley 20 to a second pulley 24 which is mounted on the shaft 26 of an electric motor 28, said motor being shown fragmentarily only since it is of conventional construction. The two base members 10 and 12 and the motor may be mounted on a suitable horizontal support 30. Screws or bolts 32 may secure the base members to said horizontal support.

It will be noted in Fig. 4 that drive shaft 18 is connected to a gear wheel 34. It will further be noted that gear wheel 34 meshes with a larger gear wheel 36 on shaft 38. Also secured to shaft 38 is a gear wheel 40 which meshes with still another gear wheel 42 on shaft 44. Shaft 44 is journaled into the two side frame members for rotation therein. It will be seen in Figs. 1 and 2 that a pitman arm 46 is secured to shaft 44 for angular movement therewith. This pitman is of channel shape as Fig. 2 clearly shows and it accommodates a slide 48. The slide may be locked in any selected position in said channel-shaped pitman so as to bring it either nearer the axial center of shaft 44 or to move it farther away therefrom. It will hereinafter be understood that this constitutes the means of adjusting the machine to cut either longer or shorter lengths of strip material or the like.

A screw 50 is secured to slide 48 and it will be understood that this screw is provided with a cylindrical shank which functions in the manner of a stud shaft. There is an annular shoulder between said shank and the threaded portion of the screw which engages slide 48. A rack 52 is supported at its upper end on said bolt or screw 50 and more particularly on the shank portion thereof. The rack is free to pivot about the axis of said shank. Rack 52 projects through openings formed in a cylindrical housing 54 which encloses a pinion 56. This pinion is attached to a clutch of the free wheeling or over-running type, such as the Hilliard clutch made by The Hilliard Corporation of Elmira, New York. This clutch is secured to a shaft 58 which is also journaled into the two side frame members of the machine.

Secured to shaft 58 between the two side frame members is a friction roller 60. Situated below friction roller 60 is a second friction roller 62 mounted on a shaft 64 which is similarly journaled into the two side frame members. These two shafts may also be suitably supported by bearings. The space between the two friction rollers is large enough to accommodate a strip 66 of suitable material. It will be noted that a table or platform 68 is situated behind and between the two rollers and a similar table or platform 70 is situated in front of and also between said rollers. The width of the tables may correspond to the width of the strip or tape 66 and side walls 72 and 74 are provided on the two table portions to guide said strip in a predetermined path of movement. This strip may be drawn from a reel or roll which is conventional in every respect and is not shown in the drawing.

The two rolls 60 and 62 engage the strip between them and they are responsible for advancing the strip to the cutter at predetermined intervals. Gear wheel 42 is a constantly rotating gear wheel which carries the pitman 46 around with it in a circular path. The distance of slide 48 from the axial center of shaft 44 will determine the range of movement of rack 52 which is connected to said slide by means of the screw 50. The rack will engage in reciprocating movement in addition to the arcuate movement of its upper end moving in a circular path together with slide 48. The reciprocating movement of rack 52 is communicated to the pinion 56 which it engages and said pinion turns first in one direction and then in the opposite direction. It will be recalled that pinion 56 is connected to a clutch of the Hilliard type or the like and that said clutch is connected to shaft 58. The clutch is conventional and consequently is not illustrated in the drawing. However, the element marked 76 in Fig. 1 is intended as a schematic representation of the clutch. It will further be understood that a clutch of this kind is not critical in the present invention. It will suffice if a ratchet mechanism or any other mechanism which transforms a reciprocating linear movement to an intermittent angular movement in a single direction is employed.

It will be observed from the foregoing that the reciprocating movement of rack 52 and the corresponding angular movement of pinion 56 are transformed by clutch 76 to an intermittent angular movement of shaft 64 in a single direction. Since roller 62 is secured to said shaft 64 the net result will be to cause said roller to turn intermittently in the same direction. When tape 66 is placed on guide 68 between the two rollers 60 and 62, it will be engaged frictionally by said rollers and it will be caused to move longitudinally of itself in leftward direction as viewed in the drawing. The movement of the tape will be intermittent to correspond to the intermittent movement of roller 62. The extent of movement of the tape will depend upon the extent of movement of said roller and the extent of movement of the roller will depend upon the radial distance of slide 48 from the axial center of shaft 44. The longer the distance of said slide from said shaft, the longer the stroke of rack 52 and the greater the angular distance roller 60 will turn on each stroke of the rack. It will be understood from the foregoing that the two rollers 60 and 62 are the feed rollers of the machine and while roller 60 is simply an idler, its frictional engagement with the tape, coupled with the frictional engagement of the tape with roller 62, enables said roller 60 to cooperate with roller 62 as a feed roller.

The movement of rack 52 is not merely in a longitudinal path coincident with its longitudinal axis, but also in an orbital path particularly at its upper end where it follows the arcuate movement of slide 48. Consequently, rack 52 not only moves longitudinally of itself in both vertical directions but it also rocks sidewardly both to the left and to the right as viewed in Fig. 1. It is necessary, therefore, for cylindrical housing 54 to be able to engage in angular reciprocating or oscillating movement under the influence of the rocking movement of the rack. Cylindrical housing 54 is therefore free to turn in either direction about the longitudinal axis of shaft 64. It may be found necessary or desirable to dampen the free movement of cylindrical housing 54 and consequently a braking device is provided for this purpose. This braking device consists of an arcuate band 80 which is affixed to a bracket 82 at its lower end. Bracket 82 is pivotally mounted on screw 84 which is secured to side frame member 14. The opposite or upper end of band 80 has an offset portion 86 which is provided with a hole to accommodate an adjusting screw 88. The adjusting screw is adjustably secured to a screw or stud 90 which is secured to side frame member 14. A compression spring 92 is mounted on said screw 88 between the upper end of band 80, which is bent into perpendicular relation to said screw 88, and the head of said screw. The spring exerts a tensional force upon band 80 in rightward direction as viewed in Fig. 1. On the inner side of arcuate band 80 is a brake shoe 94 which engages the peripheral surface of cylindrical housing 54.

The action of this braking mechanism upon the cylindrical housing tends to dampen the oscillating movement of said cylindrical housing and the extent to which a damping effect is produced depends upon the tensional force exerted by spring 92. This force may be modified either to increase it or decrease it by simply adjusting screw 88.

It may be found desirable to drive both feed rollers 60 and 62 mechanically rather than relying upon friction to drive the upper of said feed rollers, namely roller 60. The mechanism for driving feed roller 60 mechanically rather than frictonally is shown in Figs. 2 and 5. It will be noted that a gear wheel 96 is secured to shaft 58. Another gear wheel 98 is secured to shaft 64. These two gear wheels are mounted within a cover or casing 100 and it will be noted that they are in mesh with each other. Consequently, when shaft 64 and roller 62 and gear wheel 98 turn in one direction, gear wheel 96, shaft 58 and feed roller 60 will turn in the opposite direction. Compare curved arrow 102 in Fig. 4 with curved arrow 78 in the same figure.

Secured to the front of the two side frame members is a pair of vertically extending tracks or guides 104 and 106 respectively which are cut out along their facing edges to receive a guillotine cutter 108. Retaining plates 110 and 112 are secured to the guides or tracks 104 and 106 to hold the cutter 108 in place, that is, to prevent lateral or horizontal displacement thereof but to permit vertical movement in both directions. Cutter 108 is normally situated at the upper ends of the guide ways and a complementary cutter 114 is fixed in position between the guide members 104 and 106 at their lower ends in offset relation to the first mentioned cutter 108. See Figs. 2 and 4. It will be noted in Fig. 4 that an L-shaped member 116 is situated at the lower ends of the guide members and that its foot portion supports the lower cutter 114. This lower cutter is the fixed cutter and the upper cutter 108 is the movable cutter of the machine. It will be noted that the cutting edge of the fixed cutter 114 is situated slightly in front of and slightly below the tape guide 70. Similarly, the movable cutter 108 in its inoperative position is situated in spaced relation to the fixed cutter so as to provide a space between the two cutters for the tape. When the movable cutter 108 descends, it severs the tape against the fixed cutter 114.

Vertical movement of the movable cutter 108 is effected by the crank means shown in Figs. 2 and 4. A vertical shaft 118 is secured at its lower end through a bracket 120 to the upper end of cutter 108. The upper end of shaft 118 is adjustably secured to a yoke 122 which is slotted to receive shaft 44. The slot in said yoke is indicated in Fig. 4 by the reference numeral 124 and it will be noted that said slot is vertically elongated. Consequently, yoke 122 is free to move vertically in either direction within the range or limitations of slot 124 but it is prevented from moving in a horizontal direction relative to shaft 44. A pin 124a projects sidewardly from yoke 122 and serves as a cam follower relative to cam tracks 126 formed in cam 128. Cam 128 is secured to shaft 44 for rotation therewith and the inter-engagement of pin 124a with cam track 126 will cause yoke 122 to move in vertical direction, first downwardly and then upwardly. The shape of the cam track will determine the relative speed of movement of the yoke at key points along its path of movement.

It will be recalled that yoke 122 is connected through shaft 118 with the movable cutter 108. Consequently, when the yoke 122 is caused to engage in vertical movement, shaft 118 will move integrally therewith and so will the movable cutter 108. It will be observed that this movement of the cutter is synchronized with the strokes of rack 52. When the rack moves to feed or advance the tape or strip, the movable cutter remains in elevated position. When the tape or strip is advanced a predetermined distance, the cutter 108 will descend to sever said tape or strip. Cutter 108 will once again ascend to inoperative position and the tape or strip will once again be advanced as above set forth.

It will be understood at this point that the entire cutter assembly is mounted for angular movement about a vertical axis coinciding with the longitudinal axis of shaft 118. Pin 130 is secured to a crossbar 132 which is fastened at both ends to the two side frame members. Pin 130 projects upwardly through a hole in bracket 116 above mentioned. The bracket supports the guide tracks for the movable cutter 108 and it also supports the fixed cutter 114. Bracket 120 above mentioned is secured to the movable cutter 108 and it is slidably movable therewith in both vertical directions along the guide tracks 104 and 106.

Shaft 118 projects through a fixed bearing 134 which enables said shaft to engage in vertical movement longitudinally of itself and also in angular movement about its longitudinal axis. Shaft 118 is aligned with pin 130 and said shaft and said pin constitute the pivotal means about which or on which the entire cutter assembly turns. A boss 136 is formed on fixed bearing 134 and this boss is, of course, annularly shaped to accommodate shaft 118. There is a collar 138 on said boss and on said shaft and said collar supports a pinion 140. This pinion is connected to shaft 118 in such manner that when the pinion turns said shaft turns with it. This can be done in any one of many conventional ways as by providing a non-circular hole in the pinion and a shaft portion 142 of like shape projecting therethrough. This would not interfere in any way with the vertical movement of shaft 118 but said shaft and said pinion would turn integrally with each other about the longitudinal axis of said shaft 118.

Pinion 140 engages a rack 144 which is supported by the two side frame members. A channel is provided for said rack in said side frame members and a pair of L-shaped retaining plates 146 are secured to said side frame members to lock the rack in place therein while leaving it free for longitudinal movement in either lateral direction as viewed in Fig. 2. A pin 148 is provided at one end of rack 144 and said pin rides in a channel 150 which serves as a cam track for said pin.

Channel or cam track 150 is mounted on a supporting plate 152 which may hereinafter be designated as a cam plate. This plate is secured to a slide plate 154 on one of the side frame members, namely, side frame 16, by means of screws or bolts 153 extending through holes 155 in plate 152. Slide plate 154 is mounted for vertical movement in both directions so as to carry the cam plate 152 with it in both directions. This vertical movement of the cam plate causes lateral movement of rack 144 when the cam track 150 is disposed at an angle to the vertical. The extent of lateral movement of the rack depends upon the angle said cam track bears to the vertical and, of course, when the cam track is situated vertically, there will be no lateral movement of the rack.

An important feature of this invention is the adjustable character of the cam mechanism. The cam track 150 is so mounted that it may be set to any desired angular position relative to the vertical and it may also be moved laterally in either direction. It is therefore possible to control the movement of the rack in a virtually infinite number of ways.

Specifically, the upper end of cam track 150 is pivotally secured by means of screw 151 to a bar 153. The lower end of said cam track is pivotally secured by means of screw 155 to bar 157. Screw 151 projects through a slot 159 in plate 152. Screw 155 projects through a cutout 161 in said plate 152. Another slot 163 is provided in the plate 152 in alignment with slot 159. Slidably mounted in slot 163 is a slide 165 having an indicator portion 167. A screw 169 connects the slide 165 to the bar 153. Said screw 169 projects through slot 163. On the back of plate 152 there may be a pair of guide bars 171 and 173 respectively on opposite sides of bar 153. Bar 153 is thereby enabled to slide longitudinally of itself and laterally of plate 152 when screws 151 and 169 are relatively loose. When it is desired to fix bar 153 in position, all that need be done is to tighten screw 169.

The same arrangement also applies to bar 157. A slot 175 is provided in plate 152 in substantial alignment with cutout 161. A slide 177 is provided in said slot 175 and said slide is provided with an indicator portion 179. A screw 181 extends through slot 175 and attaches slide 177 to bar 157. When the two screws 155 and 181 are relatively loose, said bar 157 is free to move longitudinally of itself laterally of the plate 152. To fix its position, screw 181 is tightened.

It will now be apparent that cam track 150 may be shifted to any desired position in order to control the movement of rack 144 and thereby to control the angular movement of the two cutters and the frame which supports them. The angular position of the cutters about the axis of shaft 118 and pin 130 will determine the cutting angle by which the tape is cut. A scale 183 is attached to plate 152 opposite indicator 167 and another scale 185 is attached to said plate opposite indicator 179. These scales may be used to fix the position of the cam track 150 so as to provide for any selected cutting angle. Actually, the two scales relate to the two ends of each cut strip of tape so that at one end the tape may be cut across at a 90 degree angle and at its opposite end at a 45 degree angle. See Fig. 8. These angles are, of course, purely illustrative.

Cam plate 152 is removably secured to a vertically movable plate 154 which has a cutout 156 formed therein. This cutout may be rectangular in shape to accommodate a cam 158 on shaft 160. Secured to said shaft is a gear wheel 162 which meshes with another gear wheel 164 on shaft 44. As shaft 44 rotates, cam 158 will be caused to engage in rotary movement. The effect of such rotary movement will be to cause plate 154 to move vertically, first in one direction and then in the opposite direction. Since cam plate 152 is secured to plate 154, this vertical movement of plate 154 will cause horizontal movement of rack 144 which engages said cam plate 152 as above described. The cutter assembly will accordingly be caused to turn first in one direction and then in the opposite direction in accordance with the shape and position of cam slot 150.

More specifically, the location of cam track 150 on cam plate 152 and the angular position of said cam track will determine the cutting angles of the cutter at both ends of each length of tape 66. In its position illustrated in Fig. 6, cam track 150 will cause the cutter to cut both ends of the tape at an angle of 90 degrees. This is indicated by indicators 167 and 177 respectively.

Should it be desired, for example, to cut both ends of the tape at an angle of 45 degrees, the cam track would be moved rightwardly as viewed in Fig. 6 until both indicators 167 and 177 point to calibrations 45. The cam track would still remain in vertical position but it would, nonetheless, provide for a 45 degree cut at both ends of the tape. The reason for this may be found in the fact that moving the cam track rightwardly also causes the rack 144 to move rightwardly and by reason of the engagement of said rack with pinion 140, this has the effect of pivoting the cutter to a 45 degree angle. Both ends of the tape will be cut at an angle of 45 degrees and in parallel relation to each other, the tape becoming, in effect, a parallelogram. There would be no need to provide a 45 degree calibration to the left of the 90 degree calibration on scale 183 since such 45 degree calibration in combination with the 45 degree calibration at the left end of scale 185 would produce precisely the same result as the two 45 degree calibrations at the right ends of said scales.

Another illustration will help explain the relationship of the cam track to the cutting angle. Let it be assumed that it is desired to cut the tape at an angle of 90 degrees a one end and at an angle of 45 degrees at the opposite end. This may be done by pivoting the cam track so that the lower indicator 177 is moved either leftwardly or rightwardly to one of the 45 degree calibrations while the upper indicator 167 remains positioned at the 90 degree calibration.

A third illustration would involve cutting both ends of the tape at an angle of 45 degrees, the ends, however, being oriented in opposite directions and consequently being in nonparallel relation to each other. This may be arranged by positioning the cam track 150 in canted position, indicator 167 being located opposite calibration 45 on scale 183, and indicator 177 being located opposite calibration 45 at the left end of scale 185.

It will be understood that the pivotal movement of the cutter from one angular position to another takes place while the cutter is in elevated position above and out of engagement with the tape. The cutter is in its prescribed angular position before it engages the tape. This is of course possible because the angular movement of the cutter is synchronized with its vertical movement.

Cam 128 makes one complete revolution for every half revolution of cam 158. When cam 128 is in its Fig. 4 position, cutter 108 is in its lowermost position, in engagement with complementary cutter 114 immediately following severance of the work. A 180 degree movement of cam 128 from its Fig. 4 position will raise cutter 108 to its uppermost position, farthest removed from complementary cutter 114. Moving cam 128 in the same direction an additional 180 degrees will, once again, cause cutter 108 to descend into the work, severing engagement with complementary cutter 114.

When cam 158 is in its uppermost position as shown in Fig. 4, the cutter assembly will occupy a given angular position depending upon the position of the lower end cam track 150 as above described. While the cutter assembly is in such angular position a cutting operation takes place. A 180 degree movement of cam 158 will result in said cam occupying its lowermost position. The cutter assembly will now be in the same angular position as when cam 158 was in its Fig. 4 position or in another angular position, depending upon the position of the upper end of cam track 150. In the time it took for cam 158 to move from its uppermost position as viewed in Fig. 4 to its lowermost position 180 degrees away, cam 128 has moved a full 360 degrees from and back to its Fig. 4 position.

Stated differently, cam 128 is directly driven by shaft 44 which is driven through gears 42, 40, 36 and 34 from drive shaft 18 and shaft 160 which carries cam 158 and gear 162 which has a diameter twice that of gear 164 carried by shaft 44 is driven through gears 162, 164 so that shaft 160 is driven at half the speed of shaft 44. Due to the particular shapes of cams 128 and 158, the cutter 108 will be reciprocated during one complete cycle of rotation of shaft 44, whereas cam 158 will reciprocate cam plate 154 upwardly and downwardly. Cam 158 will reciprocate cam plate 154 upwardly and downwardly from a center position with the cam plate remaining stationary in its top and bottom positions throughout an angular movement of shaft 160 of approximately 30°.

The foregoing is illustrative of a preferred form of this invention and it will be understood that this preferred form may be modified and other forms may be provided within the broad spirit of the invention and the broad scope of the claims.

I claim:

1. A variable angle strip material cutting machine having a pivotally mounted cutter, reciprocating drive means connected to said cutter to move it along its pivotal axis into and out of cutting engagement with a strip material workpiece, and cam-actuated rack and pinion drive means connected to said cutter for changing its angular position, said means including a cam follower and a cam track engaged by said cam follower, said cam track being adjustably secured to a reciprocating support synchronized with said reciprocating drive means, whereby the cam track is caused to engage in reciprocating movement relative to said cam follower to actuate the cam follower, the angular position of the cutter being regulated in accordance with the shape and position of said cam track.

2. A variable angle strip cutting machine comprising an intermittent feed for intermittently feeding continuous lengths of strip material or the like, a cutter mounted for movement across the path of movement of said strip material to sever said material at predetermined intervals synchronized with the intermittent feed of said strip material, reciprocating drive means connected to said cutter to move said cutter into and out of cutting engagement with said strip material across said path of movement of said strip material, said cutter being also mounted for angular movement relative to said strip material to vary the cutting angle, and means synchronized with said intermittent feed and connected to said cutter to cause angular movement of said cutter prior to the movement of said cutter into cutting engagement with said strip material, said cutter being mounted on a shaft which itself is mounted for angular movement about its longitudinal axis, said axis being substantially perpendicular to the path of movement of the strip material, the means for causing angular movement of the cutter comprising a pinion connected to said shaft, a rack engaging said pinion, a cam follower on said rack and a cam engaging said cam follower, said cam being reciprocally movable to cause reciprocating movement of the rack, the pinion, the shaft and the cutter on said shaft, and drive means connected to said cam and causing it to engage in reciprocating movement in synchronization with the operation of said intermittent feed, said cam comprising a cam track adjustably mounted on a supporting plate, said supporting plate being connected to said drive means, said cam track being pivotally secured to said supporting plate so as to be pivotally adjustable thereon, and means locking said cam track on said supporting plate in selected angular positions thereon.

3. A variable angle strip cutting machine comprising an intermittent feed for intermittently feeding continuous lengths of strip material or the like, a cutter mounted for movement across the path of movement of said strip material to sever said material at predetermined intervals synchronized with the intermittent feed of said strip material, reciprocating drive means connected to said cutter to move said cutter into and out of cutting engagement with said strip material across said path of movement of said strip material, said cutter being also mounted for angular movement relative to said strip material to vary the cutting angle, and means synchronized with said intermittent feed and connected to said cutter to cause angular movement of said cutter prior to the movement of said cutter into cutting engagement with said strip material, said cutter being mounted on a shaft which itself is mounted for angular movement about its longitudinal axis, said axis being substantially perpendicular to the path of movement of the strip material, the means for causing angular movement of the cutter comprising a pinion connected to said shaft, a rack engaging said pinion, a cam follower on said rack and a cam engaging said cam follower, said cam being reciprocally movable to cause reciprocating movement of the rack, the pinion, the shaft and the cutter on said shaft, and drive means connected to said cam and causing it to engage in reciprocating movement in synchronization with the operation of said intermittent feed, said cam comprising a cam track adjustably mounted on a supporting plate, said supporting plate being connected to said drive means, each end of said cam track being pivotally and slidably attached to said supporting plate for pivotal and laterally slidable adjustment thereon, and means locking each said end of the cam track to the supporting plate in selected positions of said cam track on said supporting plate.

4. A variable angle strip material cutting machine having a pivotally mounted cutter, reciprocating drive means connected to said cutter to move it along its pivotal axis into and out of cutting engagement with a strip material workpiece, and cam-actuated rack and pinion drive means connected to said cutter for changing its angular position, said means including a cam follower and a cam track engaged by said cam follower, said cam track being adjustably secured to a reciprocating support synchronized with said reciprocating drive means, whereby the cam track is caused to engage in reciprocating movement relative to said cam follower to actuate the cam follower, the angular position of the cutter being regulated in accordance with the shape and position of said cam track, said reciprocating support comprising a plate and the cam track being adjustably secured to said plate by being pivotally and slidably secured at each end to said plate.

5. A variable angle strip material cutting machine having a pivotally mounted cutter, reciprocating drive means connected to said cutter to move it along its pivotal axis into and out of cutting engagement with a strip material workpiece, and cam-actuated rack and pinion drive means connected to said cutter for changing its angular position, said means including a cam follower and a cam track engaged by said cam follower, said cam track being adjustably secured to a reciprocating support synchronized with said reciprocating drive means, whereby the cam track is caused to engage in reciprocating movement relative to said cam follower to actuate the cam follower, the angular position of the cutter being regulated in accordance with the shape and position of said cam track, said reciprocating support comprising a slotted plate and the cam track is disposed flat against said plate, said cam track being secured to said plate by means of screws, at least one screw passing through a slot in said plate, whereby, when the screws are loosened, said cam track is both pivotally and slidably movable relative to said plate to any selected position thereon, and whereby, when the screws are tightened, said cam track is fixed in such selected position.

6. A variable angle strip material cutting machine having a pivotally mounted cutter, reciprocating drive means connected to said cutter to move it along its pivotal axis into and out of cutting engagement with a strip material workpiece, and cam-actuated rack and pinion drive means connected to said cutter for changing its angular position, said means including a cam follower and a cam track engaged by said cam follower, said cam track being adjustably secured to a reciprocating support synchronized with said reciprocating drive means, whereby the cam track is caused to engage in reciprocating movement relative to said cam follower to actuate the cam follower, the angular position of the cutter being regulated in accordance with the shape and position of said cam track, said cam track being adjustably secured to said reciprocating support by screw means, said cam track being mounted on said reciprocating support for pivotal movement relative thereto into any selected position thereon, said screw means being adapted to fix said cam track to said reciprocating support in any such selected position.

References Cited in the file of this patent

UNITED STATES PATENTS

| | | |
|---|---|---|
| 467,316 | Talcott | Jan. 19, 1892 |
| 1,559,871 | Heyman | Nov. 3, 1925 |
| 1,665,834 | Ayer | Apr. 10, 1928 |
| 1,868,226 | Draher et al. | July 19, 1932 |
| 2,026,402 | Schlemmer | Dec. 31, 1935 |
| 2,354,294 | Schimmel | July 25, 1944 |
| 2,720,400 | Marsden | Oct. 11, 1955 |